Dec. 28, 1954  A. P. GIRAITIS  2,698,347
MANUFACTURE OF HALOGEN COMPOUNDS
Filed Jan. 30, 1951
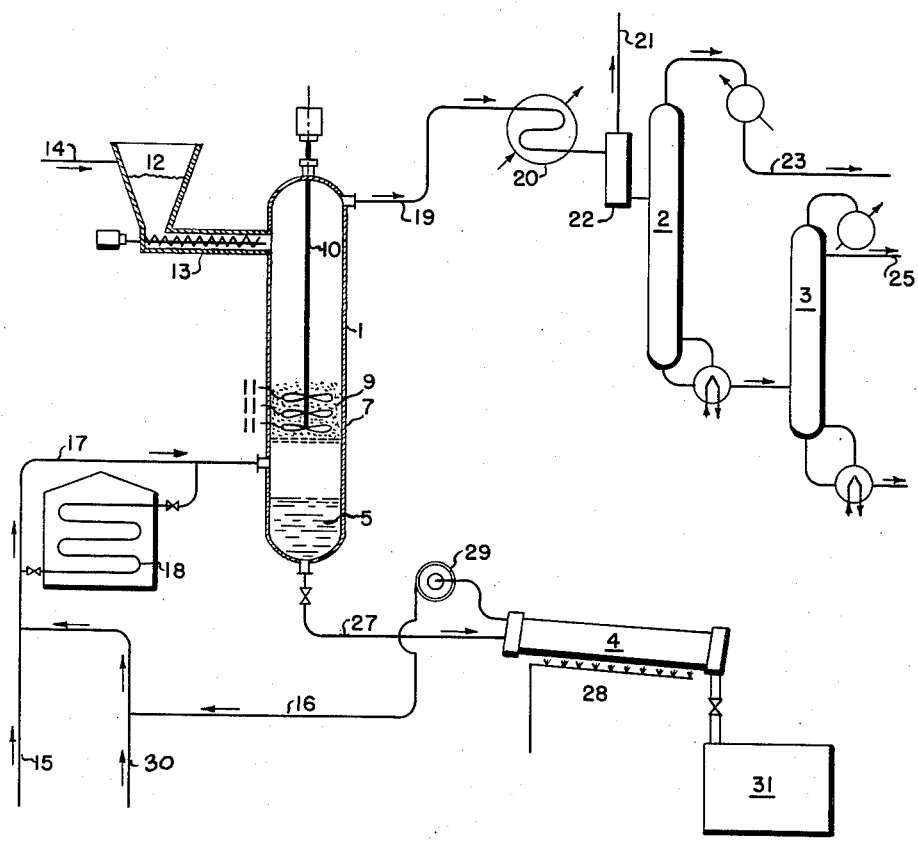
INVENTOR.
ALBERT P. GIRAITIS
BY Kenneth Swertwood

# United States Patent Office 2,698,347
Patented Dec. 28, 1954

2,698,347

MANUFACTURE OF HALOGEN COMPOUNDS

Albert P. Giraitis, Baton Rouge, La., assignor to Ethyl Corporation, New York, N. Y., a corporation of Delaware Application January 30, 1951, Serial No. 208,527

10 Claims. (Cl. 260—659)

This invention relates to the manufacture of halogen substituted organic compounds. More particularly, the invention relates to a new and novel process whereby halogen derivatives of organic materials, such as hydrocarbons, alcohols, acids, and the like, are produced directly from the primary organic compound and an inorganic salt of the desired halogen.

Halogen derivatives of organic compounds in the production of which my invention is applicable are extremely numerous and are finding continuously increasing usage in industry. As a few typical examples of such chemicals may be mentioned ethyl chloride, used in the manufacture of tetraethyl lead and ethyl cellulose; methyl chloride, used in the manufacture of synthetic rubber; ethylene chloride or 1,2-dichloroethane, used as a component in anti-knock mixtures, and in the manufacture of certain types of elastomeric materials; dichloroacetic acid, used for manufacture of weed destruction agents; and the several chlorofluoroalkanes, which have found wide usage as non-toxic refrigerant fluids. Tetrachlorethane and pentachlorethane are further examples of polychloro compounds which can be manufactured by my process. The foregoing list will of course be understood to be only illustrative, exemplifying the widely varied types of compounds to which the process is related, and the many uses to which such compounds are put. Numerous other compounds will be familiar to those skilled in the art.

The processes heretofore known in the production of virtually all halogenated organic compounds have included the reaction of an elemental halogen with the compound to be treated, the addition of a hydrogen halide to an unsaturated linkage of an unsaturated analog compound, or the reaction of a hydrogen halide with a hydroxy substituent. These prior general reactions have all been widely utilized and have been rather extensively studied. They all have the same limitation with respect to potential economy; however, specifically, the processes require that the halogen to be used be isolated from the natural sources either as elemental halogen or the hydrogen halide. Thus, the final manufacturing economy invariably reflects and is limited by the cost of either separately manufacturing an elemental halogen, or of separately producing a hydrogen halide.

The object of my invention is to provide a new and hitherto unknown process for the preparation of halogen derivatives of organic materials. A further object is to provide a process whereby halogen derivatives of organic materials are prepared directly from inorganic halide salts and the organic compound, without the necessity of prior and separate isolation of the elemental halogen, or the manufacture of hydrogen halide. Other objects will appear hereafter.

I have now discovered that halogen derivatives of organic materials can be made directly from an organic material and an inorganic halide. In its broadest terms, my invention comprises a process of introducing one or more halogen substituents to an organic compound by the action of an inorganic compound of the desired halogen on the organic compound, in the presence of sulfur trioxide. According to the usual manner of practicing my invention, the organic compound to be treated is introduced concurrently with sulfur trioxide into contact with the halogen salt. The reaction components are maintained at an elevated temperature; the halide salt being maintained in a bed which is more or less coextensive with the reaction zone. The bed may be stationary or may be stirred by means of rotating agitating elements.

The reaction produces the desired halogen derivatives of the organic material, plus sulfur dioxide and a hydrogen halide, these components being withdrawn as an overhead gaseous stream. In addition to these products, a non-gaseous product is obtained, comprising sulfate compounds corresponding to the solid halogen salt charged. Ordinarily, the sulfate product is a fluid or melt at the temperature of operation and can be easily and continuously withdrawn from a reactor. In the case of some metals, however, the sulfate product is a solid. In such cases it is sometimes preferred to allow the sulfate products to accumulate and withdraw them from the bottom of the reactor at frequent intervals.

The process utilizes the discovery that the halogen content of inorganic salts is directly transferable to an organic compound as a substituent by the influence of sulfur trioxide as a reactant or agent. The precise details of the chemical mechanism of the process are not fully known, although equations can of course be written representing the overall transformations occurring. Illustrative of such overall transformations are the following equations representing a specifically important embodiment of the invention, viz., the manufacture of ethyl chloride directly from ethane and common salt.

(A) $3SO_3 + 2NaCl + C_2H_6 \rightarrow Na_2S_2O_7 + C_2H_5Cl + SO_2 + HCl$ (B) $2SO_3 + 2NaCl + C_2H_6 \rightarrow Na_2SO_4 + C_2H_5Cl + SO_2 + HCl$ In practice the proportions of reactants and other conditions can be varied so that the ethyl chloride generated is produced preponderantly by either of the overall reactions indicated. However, in order to obtain certain specific advantages to be hereafter described, in a preferred embodiment the conditions are controlled so as to provide an appreciable amount of ethyl chloride production according to Reaction A.

The manner of operation and the advantages of the process will be more fully understood from the examples and description given hereafter and the accompanying figure. The figure is a generalized diagrammatic representation of a preferred mode of carrying out the process. According to this preferred mode, the metal sulfate product stream is a liquid melt at the temperature of operation. The principal units of the apparatus illustrated by the figure are a reactor, and recovery systems for the halogenated product stream and the metal sulfate product stream.

Referring to the figure, the feed materials are charged to a reactor 1. Gaseous products are condensed and separated in a recovery system including the fractionating columns 2 and 3, and the metal sulfate stream is treated in a recovery system including a heated kiln 4.

The reactor 1 is a vertical cylindrical vessel divided into a collection zone 5 and a reaction zone by a grid. A refractory lining 8 is preferred because of the corrosive nature of the reacting components. A grid 7 supports a bed 9 of metal halide salt. An axially positioned shaft 10 drives and supports several agitating blades 11. Rotation of the shaft and agitator blades insures that the halide salt bed will be intimately contacted with the gaseous reactants, and that the liquid products of reaction will be drained from the solid salt to the collection zone as rapidly as formed.

The salt supply is maintained in an enclosed hopper 12, which feeds into a seal conveyor 13, which in turn discharges the salt feed to the reactor 1. A small flow of inert gas, such as nitrogen, is introduced through line 14 to the hopper and flows through the granular salt in the hopper and conveyor 13 into the reactor, thereby assuring that no reaction will occur within the salt supply system.

The gaseous feeds to the system, sulfur trioxide and an organic material, are received through lines 30 and 15, respectively. The fresh sulfur trioxide is combined with a recovered stream of sulfur trioxide recycled in line 16. The sulfur trioxide and organic compound are combined in line 17 and can be fed directly to the reactor, or if necessary, can be preheated to reaction temperature by passage through a heating coil 18.

In the reactor, the sulfur trioxide and gaseous organic material contact the salt bed and react apparently immediately, and extremely rapidly. The reaction converts the salt to a mixture of sulfates which is liquid at the preferred operating temperature and drains through the grid 7 to the collection zone 5. The gaseous products of the reaction pass upwardly and are discharged from the reactor through line 19 to the recovery section.

The precise arrangement of the recovery system for the gaseous reaction products will, of course, vary with the halogenated organic materials produced and their volatility with respect to the sulfur dioxide also generated in the reaction. The recovery system shown is intended for processing and recovery of halogenated organics less volatile than sulfur dioxide. The gaseous products are cooled in condenser 20 to a temperature sufficiently low to liquefy virtually all the halogenated products. Non-condensible waste diluents are vented through line 21 from a disengaging chamber 22. The condensate stream is then fed to column 2 which distills the sulfur dioxide from the halogenated compounds, the sulfur dioxide being discharged through line 23. The sulfur dioxide can be reoxidized to sulfur trioxide by conventional means, thereby providing high overall materials utilization for the process.

The bottoms from fractionator 2, comprising primarily halogenated organics, are fed to fractionator 3, the purified major product being usually discharged as an overhead product through line 25. The bottoms stream from fractionator 3 usually comprises the by-product halogenated compounds containing a higher halogen content than the principal product.

The liquid reaction products, in collection chamber 5, will vary in composition according to the proportions of reactants and the conditions of reaction. In the preferred mode of operating the liquid products can be regarded as a loose chemical combination of a sulfate plus one or more additional molecules of sulfur trioxide combined with the sulfate in the same manner as water of hydration. Such materials have the advantage that they can be pumped and transferred as liquids and will frequently be utilized as produced without further processing. If the basic sulfate, such as sodium sulfate, is desired, as in the present embodiment, the excess sulfur trioxide can be driven off and recovered by heating the product mixture. This is conveniently effected by feeding the liquid sulfate stream through line 27 to rotating kiln 4, which is externally heated by burner assembly 28 to an elevated temperature of the order of 500° C. An exhauster 29 removes the sulfur trioxide released in the kiln and transfers it through line 16 for combination with fresh sulfur trioxide and reuse in the process. The metal sulfate discharged from kiln 4, freed of the excess sulfur trioxide, is collected in an enclosed and removable storage bin 31.

The process can be utilized to advantage for numerous different feed materials and products. The following examples demonstrate the process as applied with various hydrocarbons and different halogen compounds of metals.

Example I

A gaseous mixture of ethane and sulfur trioxide was formed, containing about 44 volume percent ethane and 56 volume percent sulfur trioxide. The gaseous feed mixture was introduced into the bottom of a vertical tube reactor containing a charge of 575 parts of granular sodium chloride. The reactor and the sodium chloride charge were maintained at a temperature of about 350° C. to 400° C. A liquid product reservoir was maintained at the bottom of the reactor by means of supporting the solid salt charge on a grid, thereby allowing liquid products of the reaction to flow to the bottom of the reactor tube and be separately withdrawn.

The reaction proceeded smoothly and without violence, the reaction taking place practically immediately and at or adjacent to the point of initial contact with the salt, of the ethane-sulfur trioxide feed mixture. The gaseous products stream discharged from the top of the reactor include ethyl chloride, dichloroethanes, hydrogen chloride, sulfur dioxide, some unreacted ethane and traces of other impurities, such as carbon dioxide. Thirty percent of the ethane fed was reacted and approximately 94 percent of the reacted ethane was converted to ethyl chloride.

A melted or liquid mixture was collected at the bottom of the reactor and consisted of approximately 85 percent sodium pyrosulfate and 15 percent sodium chloride. The relatively high concentration of sodium chloride in this specific example was due to mechanical entrainment of sodium chloride in the downflowing melt. It has been found that with careful operation, the sodium chloride content is easily reduced to one or two percent.

The foregoing example illustrates the important application of the process to manufacture of ethyl chloride directly from common salt. The process is of course not limited to this specific instance, but can be utilized in processing the chlorides or other halides of other metals. The following example describes the utilization of calcium chloride, which is available in large quantities as a low priced by-product of the Solvay process for production of caustic soda.

Example II

A gaseous mixture of commercial ethane and sulfur trioxide was formed comprising 51 volume percent sulfur trioxide, 47 percent ethane and about 2 percent unsaturated hydrocarbons (ethylene and propylene). The gaseous mixture was contacted with a charge of calcium chloride in a vertical reactor. The reactor and contents were maintained at 300° C. to 350° C. The reactor overhead was passed through a condenser and cooled to about —80° C. to liquefy the condensible products. In reacting about 39 parts by volume of the ethane feed, two parts by volume of ethyl chloride were produced, corresponding to a yield of about 5.5 percent. A substantial amount of carbon dioxide and carbon monoxide impurity was produced owning to the presence of unsaturated hydrocarbons in the ethane feed stream. The residue in the reactor consisted of calcium sulfate and excess calcium chloride.

As an example of the applicability of the process in manufacturing bromine derivatives directly from a metal bromide and a hydrocarbon, the following example illustrates the manufacture of ethyl bromide from ethane and potassium bromide.

Example III

A gaseous mixture of ethane and sulfur trioxide, containing 40 volume percent ethane and 60 volume percent sulfur trioxide was contacted with 72 parts of granular potassium bromide. The gaseous mixture was introduced below the charge and passed upwardly in contact therewith, as in the preceding examples. The reaction zone was maintained at a temperature of 300° to 325° C. The overhead gaseous product stream contained ethyl bromide, sulfur dioxide, hydrogen bromide, and unreacted ethane and sulfur trioxide. A total of 26 parts by weight of ethyl bromide was produced, corresponding to a yield of 91 percent on the basis of the 7.8 parts by weight of ethane reacted.

Example IV

A mixture of methane and sulfur trioxide, containing 48 percent by volume methane and 52 percent sulfur trioxide, was reacted with sodium chloride, according to the procedure used in the foregoing examples. A mixture of chloromethanes was recovered, analyzing 46 mole percent methyl chloride, 30 percent dichloromethane, 16 percent trichloromethane, and 8 percent carbon tetrachloride. A yield of 64 percent chloromethanes was obtained, based upon the methane reacted.

The nonvolatile or liquid product removed from the bottom of the reactor was substantially all sodium pyrosulfate, although it contained several percent sodium sulfate and some unreacted sodium chloride.

It will be understood that the foregoing examples are to be considered only as illustrative embodiments, and that the process is adaptable in the processing of numerous other feed materials and for numerous other chemical products. The process can be applied, in general, to any organic compound which does not rapidly pyrolyze at the temperatures of reaction and is susceptible of undergoing a substitution reaction with a halogen. Prominent among the suitable feed materials are the alkane and cycloalkane hydrocarbons. For example, when propane, butane, pentane, hexane, cyclopropane, cyclobutane, cyclopentane, cyclohexane, and cycloheptane are substituted in lieu of ethane in Example I, maintaining all other conditions the same, good yields of the following products will be obtained: isopropyl chloride, isobutyl chloride, amyl chlorides, hexyl chlorides, monochlorocyclopropane, monochlorocyclobutane, monochlorocyclopentane, monochlorocyclohexane and monochlorocycloheptane. In addition, minor quantities of the several dichloro derivatives of these hydrocarbons will be recovered, for example, 1,2-, and 1,1-dichloropropane, 1,1-, and 1,2-dichlorobutanes and the dichloro derivatives of the other hydrocarbons cited. However, the predominant product components will be the monochloro compounds above cited, owing to the proportions of reactants used.

In addition to the relatively low molecular weight hydrocarbons mentioned above, hydrocarbons of higher molecular weight can be processed, such as octane, nonane, decane, undecane, dodecane, and the like. It is preferable in reacting such higher molecular weight hydrocarbons to allow only a relatively brief residence time, and also to convert only a relatively small proportion of the hydrocarbon in one pass, thereby avoiding pyrolysis and the reaction of the sulfur trioxide with the hydrocarbon. In addition to the cycloalkane hydrocarbons already cited, their alkyl substituted derivatives can be reacted, including, for example, compounds such as methyl and 1,1-dimethyl cyclopropane, methyl cyclobutane, and similar alkyl substituted compounds.

The process is of most interest in manufacturing the halogen derivatives of alkane and cycloalkane hydrocarbons, but is also of great value in producing halogen derivatives of numerous other organic compounds containing one or more substituents capable of replacement by a halogen. Such additional organic compounds suitable as feed materials include carboxylic acids, aldehydes, ketones, ethers, esters and other organic materials. As examples of such feed materials, when acetic acid, acetaldehyde, acetic anhydride, propionic acid, succinic acid, butyl alcohol, ethanol, methanol, benzaldehyde, benzophenone, normal butyl amine, camphene phenol, toluene, biphenyl, or nitropropane are substituted for the ethane of Example I, valuable chloro derivatives will be produced in good yield. Among such products will be chloroacetic acid, chloroacetaldehyde, chloroacetic anhydride, beta chloropropionic acid, chlorosuccinic acid, 1-chloro, 4-hydroxy butane, beta-chloroethyl alchol, ortho-chlorobenzaldehyde, 2-chlorobenzophenone, 1-amino-2-chlorobutane, 3-methyl-3-chloromethyl-2-methylene-norcamphene, metachlorophenol, benzyl chloride, ortho-chlorodiphenyl, and 1-nitro-2-chloropropane.

The processing of the feed materials of the above described varieties frequently requires slightly different reaction techniques because of the greater tendency of aromatic or oxygen containing compounds to react with sulfur trioxide than exhibited by the lower molecular weight alkanes. For example, it is preferred that, in processing the above feed materials, the organic chemical and the sulfur trioxide feed be introduced in separate lines, to minimize the opportunity for direct attach of the organic compound by the sulfur trioxide. In utilizing an upflow reaction vessel of the type described in connection with the accompanying figure, it is also preferred that the point of introduction of the organic vapor be appreciably above the feed point for the sulfur trioxide.

In addition to the inorganic halides mentioned in the foregoing examples, the several other inorganic halides may be processed and equally good results will be obtained. Thus, by substituting for the sodium chloride used in Example I, other feeds being maintained the same, sodium bromide, sodium iodide, sodium fluoride, calcium fluoride, magnesium chloride, ferric chloride, ammonium chloride, barium chloride, potassium chloride, potassium iodide, aluminum chloride, aluminum bromide, and other inorganic halide salts, similarly good results will be obtained in the manufacture of chloroethanes, fluoroethanes, or bromoethanes according to the halide fed, and as joint products, the sulfates of sodium, calcium, magnesium, iron, ammonium, barium potassium and aluminum, dependent upon the cation element or group of the inorganic halide. Although the process is not limited thereto, it will be applied to best commercial advantage by using the metal halides which are either found as such in a natural state or are available as low priced by-products of other chemical processes. Examples of the metal halides which are particularly valuable for the above reasons are sodium chloride, potassium chloride and calcium fluoride or fluorspar, and calcium chloride.

It will be evident from the preceding examples that the halogenated compounds obtained are usually a mixture of the mono-substituted material plus varying quantities of dihalo and polyhalosubstituted compounds, when the organic feed material contains a plurality of replaceable atoms attached to carbon atoms of the base structure or nucleus. The distribution of the several derivatives obtained in a given instance can be varied as desired to provide a preponderance of the particular compound needed. The control of the product distribution is effected by varying the relative proportions of sulfur trioxide and organic feed. Thus, for the maximum conversion of an alkane hydrocarbon to a desired alkyl halide, the molar ratio of sulfur trioxide to hydrocarbon should be less than about 2.2 moles of sulfur trioxide to one mole of hydrocarbon. For production of the dihalo or even higher halogenated hydrocarbons, the feed ratio will be correspondingly higher. In general, in treating the low molecular weight alkane hydrocarbons, the preferred feed proportions are from 0.5 to about 8.0 or even more, moles of sulfur trioxide to one mole of alkane fed. The higher proportions of sulfur trioxide are utilized when the polyhalogenated derivatives are desired, for example, chloroform, carbon tetrachloride, tetrachloroethane, and the like.

Similarly, in manufacturing the dihalo or more highly halogenated derivatives of other organic compounds, the proportions of sulfur trioxide are correspondingly increased. Thus, by the increase in the relative amounts of sulfur trioxide the more highly halogenated organic compounds are readily made. For example, dichloro and trichloroacetic acid, chloral, dichloroacetic anhydride, and similar more highly chlorinated organic compound derivatives are thus produced in good yields by an increase in the proportion of sulfur trioxide fed.

The usual embodiments of the process utilize a single halide salt as the halogen source, as already illustrated by the preceding examples. However, particularly useful variations of the process are embodiments which utilize a mixture of inorganic halogen salts, these salts reacting and supplying halogen concurrently. Embodiments of this type, utilizing a plurality of inorganic halide salts are advantageously employed for several purposes. Thus, the use of mixed halide salts can be used to facilitate the operation of certain reactor designs or reaction techniques. Also, mixtures of salts of different halogens are advantageously employed to provide a halogenated organic product containing a plurality of dissimilar halogen substituents.

As an example of the application of a plurality of inorganic halide salts for purposes of facilitating the reaction technique may be mentioned the use of a mixture of calcium chloride and sodium chloride. This mixture is particularly advantageous in that it is adaptable to and facilitates a fluidized solids type of operation. The sulfate products from the processing of calcium chloride are dry solids at the usual temperature of operation. By providing an appreciable amount of calcium chloride as a component of the inorganic halide salts fed, the metal compounds within the reactor can be maintained in a relatively dry powdered state throughout the operation. Such a physical condition is highly desirable for use of the fluidized solids technique, whereby the solids are maintained in a suspended condition by the rising action of gaseous reactants and products. A suitable proportion of calcium chloride to the sodium chloride fed is in the ratio of about one or more parts of calcium chloride by weight to one part of sodium chloride. In such an embodiment, a mixture of calcium sulfate and sodium sulfate is removed from the reactor. The mixture is calcined to drive off excess sulfur trioxide and the soluble sodium sulfate is then leached from the mixture for later precipitation as a pure Glauber's salt product. The calcium sulfate is then dried and is suitable for conventional purposes.

Various other mixtures of salts containing the same halogen can be advantageously employed for specific purposes, or to utilize conveniently available materials. Thus, mixtures of ammonium chloride and calcium chloride provide sulfate product mixtures useful as fertilizers. Other multicomponent mixtures of like-halogen salts which can be substituted for single component feeds are, for example, naturally occurring mixtures such as sylvinite, (sodium and potassium chlorides), baeumlerite, (potassium chloride and calcium chloride) and rinneite (ferric, potassium and sodium chlorides).

As already mentioned, other embodiments utilizing a plurality of inorganic halogen salts are particularly useful in the production of halogenated organics having a plurality of dissimilar halogen substituents. As a particular example, the polyhalogenated alkanes containing both chlorine and fluorine substituents have found extremely wide usage as refrigerants and propellant materials. In the manufacture of such compounds by the present process, a mixture of inorganic chlorides and fluorides are used as the halogen suppliers, the salts concurrently reacting and supplying both fluorine and chlorine for attachment or substitution on the hydrocarbon.

As an example of such embodiments, dichloro difluoromethane is prepared as follows: A mixture of calcium chloride and calcium fluoride is introduced into a reaction zone, in the proportions of about 1.4 parts by weight of calcium chloride to one part of calcium fluoride. A mixture of sulfur trioxide and methane gas is fed to the reactor, in the proportions of eight parts by volume of sulfur trioxide to one part of methane. The reacting materials are maintained at an elevated temperature illustrated in the previous examples. A good yield of dichlorodifluoromethane will be obtained. Instead of a mixture of calcium chloride and calcium fluoride, a mixture of sodium chloride and calcium fluoride, or of sodium chloride and sodium fluoride can be substituted and equally good results will be obtained.

In addition to dichlorodifluoromethane, other compounds of this general type, but having different proportions of the halogen substituents are conveniently made by the same procedure, except that the relative proportions of the chloride and fluoride salts are appropriately altered. In order to obtain a preponderant production of trichlorofluoromethane, for example, the preferred halide salt mixture is about 4.3 parts of calcium chloride by weight to one part of calcium fluoride. For the manufacture of dichlorofluoromethane, about 2.8 parts of calcium chloride to one part of calcium fluoride are used, and for monochlorodifluoromethane, about 0.7 part of calcium chloride to one part of calcium fluoride. For these two latter compounds, the sulfur trioxide to methane feed proportions are adjusted to about six volumes of sulfur trioxide to one volume of methane.

In addition to the above cited mixed halogen derivatives of methane similar chlorofluoro derivatives of ethane may be made, for example, 1,1,2-trichloro-2,2,1-trifluoro-ethane and 1,2-dichloro-1,1,2,2-tetrafluoro-ethane and 1-chloro-1,1-difluoro-ethane. The chlorofluoro derivatives of higher alkane hydrocarbons can be made, although there is less demand for such derivatives at the present time.

A further alternative mode of operating the process involves the replacement of one or more substituent halogens or an organic feed compound with a more reactive halogen. This mode affords a means of converting less valuable chloro compounds, for example, to more valuable products containing fluorine substituents, replacing in whole or in part the chlorine substituents.

In such embodiments of the process, a halogenated organic feed material is reacted with an inorganic halide in the presence of sulfur trioxide, the inorganic halide salt being a compound of a halogen which is more reactive than the halide substituents or the organic feed compound. Broadly speaking, such embodiments thus afford a means of replacing iodine substituents with bromine, chlorine or fluorine; bromine with chlorine or fluorine, and chlorine with fluorine. Such replacement may be of all or a part of the original halogen substituents.

As an example of such an embodiment, carbon tetrachloride and sulfur trioxide are fed to a reactor charged with calcium fluoride, utilizing the same general technique such as illustrated by the examples and figure heretofore given. The products will be chlorofluoromethanes, calcium sulfate, sulfur dioxide and chlorine, the latter components ordinarily being recovered as the compound sulfuryl chloride. A typical overall reaction, for the production of dichlorodifluoromethane, will be:

$CCl_4 + 2SO_3 + CaF_2 \rightarrow CCl_2F_2 + SO_2Cl_2 + CaSO_4$

The sulfuryl chloride by-product of this process is separately recoverable and is useful as a starting material in various organic syntheses.

It will be apparent that numerous variations of this type of embodiments can be utilized to produce a wide variety of compounds. As examples of the products which are conveniently and efficiently made according to this procedure are: from ethylene bromide, 1-chloro-2-bromo ethane; from carbon tetrachloride, trichlorofluoromethane, dichlorodifluoromethane, and chlorotrifluoromethane; from hexachloroethane, 1-fluoro-pentachloroethane, 1,1-difluorotetrachloroethane, 1,2-difluorotetrachloroethane, 1,1,2-trifluorotrichloroethane, 1,1,2,2-tetrafluorodichloroethane and pentafluoromonochloroethane; from 1,1,2,2-tetrachloroethane, 1-fluoro-1,2,2-trichloroethane, 1,2-difluoro-1,2-dichloroethane, and 1,1,2-trifluoro-2-chloroethane. Numerous other feed materials can be used and products obtained in addition to the foregoing examples, as will be readily understood by those skilled in the art.

An advantage of the use of the process for the replacement of existing halogen substituents with more reactive halogens, as above described, is that it conveniently lends itself to a two step operation, thereby allowing use of the most economical inorganic halogen sources, without complicating the recovery of the by-product sulfates. Thus, for example, alkane hydrocarbons are converted to polychloroalkane derivatives in an initial reaction, using sodium chloride as the chlorine source. The polychloroalkane is then recovered and further processed in a second reaction stage, wherein fluorine substituents are supplied by calcium fluoride, producing chlorofluoroalkanes as already described. By utilizing such a two stage procedure, sulfate by-products of dissimilar metals are separately produced, thereby simplifying the recovery of such sulfates in contrast to embodiments of the process wherein dissimilar halides of different cation radicals are processed, as, for example, mixtures of calcium and sodium halides.

The temperature of operation of the reaction can be varied to permit the most efficient reactor design and economies of operation. In virtually all instances, a temperature of at least 250° C. is desired in the reaction zone, although lower temperatures are sometimes permissible when the higher molecular weight hydrocarbons are processed. The usual operating temperature, especially in treating the normally gaseous acyclic alkane hydrocarbons, is in the range of 250° C. to 450° C., although higher temperatures can be employed especially when a short residence time at reaction conditions is desirable, as when processing the higher molecular weight hydrocarbons which are more subject to pyrolysis.

The sulfur trioxide used in the process can be either a concentrated material, or it can be used as a relatively dilute stream accompanied by a substantial proportion of inert gases. A particular virtue of the process is that the product gas from a catalytic converter of a contact sulfuric acid plant can be used directly. Such gas, obtained by the catalytic oxidation, with air, of sulfur dioxide, contains about 9 or 10 mole percent sulfur trioxide.

The by-product sulfur dioxide can be liquefied and utilized for other processes, or can be reoxidized to sulfur trioxide for reuse in the production of halogenated compounds. The hydrogen halide by-product can be utilized for numerous purposes well known in the arts. From the foregoing description and examples, it will be seen that my process affords an extremely flexible and useful method for the introduction of halogen substituents into organic compounds, the halogen being derived in situ from inorganic halide salts. The process is of general application as indicated, being limited only by the following claims.

I claim:

1. A process of producing chloroethanes and sodium sulfates comprising treating in a reaction zone solid sodium chloride with ethane, at a temperature of from 250° to 450° C., in the presence of sulfur trioxide, the sulfur trioxide being in the proportion of from 0.5 mole to 8.0 moles to 1 mole of the ethane, separately withdrawing a gaseous product stream and a liquid product stream from the reaction zone, the gaseous product stream comprising chloroethanes, sulfur dioxide, and hydrogen chloride and the liquid product stream comprising sodium pyrosulfate, and then recovering the chloroethanes from the gaseous product stream.

2. A process of producing chloroethanes and calcium sulfates comprising treating in a reaction zone solid calcium chloride with ethane, at a temperature of from 250–450° C., in the presence of sulfur trioxide, the sulfur trioxide being in the proportion of from 0.5 mole to 8.0 moles to one mole of the ethane, separately withdrawing a gaseous product stream and a liquid product stream from the reaction zone, the gaseous product stream comprising chloroethanes, sulfur dioxide, and hydrogen chloride, and the liquid product stream comprising calcium sulfate, and then recovering the chloroethanes from the gaseous product stream.

3. A process for producing bromoethanes and potassium sulfates comprising treating in a reaction zone solid potassium bromide with ethane, at a temperature of from 250–450° C. in the presence of sulfur trioxide, the sulfur trioxide being in the proportion of from 0.5 mole to 8.0 moles to one mole of the ethane, separately withdrawing a gaseous product stream and a liquid product stream from the reaction zone, the gaseous product stream comprising bromoethanes, sulfur dioxide, and hydrogen bromide, and the liquid product stream comprising potassium sulfates, and then recovering the bromoethanes from the gaseous product stream.

4. A process of producing chloromethanes and sodium sulfates comprising treating in a reaction zone solid sodium chloride with methane, at a temperature of from 250–450° C., in the presence of sulfur trioxide, the sulfur trioxide being in the proportion of from 0.5 mole to 8.0 moles to one mole of the methane, separately withdrawing a gaseous product stream and a liquid product stream from the reaction zone, the gaseous product stream comprising chloromethanes, sulfur dioxide, and hydrogen chloride, and the liquid product stream comprising sodium pyrosulfate, and then recovering the chloromethanes from the gaseous product stream.

5. A process of producing halogenated hydrocarbons and metal sulfates, comprising treating in a reaction zone solid metal halide selected from the class consisting of alkali metal chlorides, alkali metal bromides, alkaline earth metal chlorides, and alkaline earth metal bromides with a saturated hydrocarbon, at a temperature of from 250° to 450° C., in the presence of sulfur trioxide, the sulfur trioxide being in the proportion of from about 0.5 mole to 8 moles to 1 mole of the hydrocarbon; separately withdrawing a gaseous product stream and a non-gaseous product stream from the reaction zone, the gaseous product stream comprising halogenated hydrocarbon, sulfur dioxide, and hydrogen halide, and the non-gaseous stream comprising metal sulfate; and recovering the halogenated hydrocarbon from the gaseous product stream.

6. Process of claim 5 in which the saturated hydrocarbon is ethane.

7. Process of claim 5 in which the saturated hydrocarbon is methane.

8. Process of claim 5 in which the metal halide is alkali metal chloride.

9. Process of claim 5 in which the metal halide is alkaline earth metal chloride.

10. Process of claim 5 in which the metal halide is alkali metal bromide.

References Cited in the file of this patent

UNITED STATES PATENTS

| Number | Name | Date |
| --- | --- | --- |
| 1,045,139 | Graul | Nov. 26, 1912 |
| 1,235,283 | Brooks et al. | July 31, 1917 |
| 1,242,208 | Lacy | Oct. 9, 1917 |
| 2,259,248 | Iler | Oct. 14, 1941 |
| 2,302,228 | Kharasch et al. | Nov. 17, 1942 |
| 2,431,880 | Merz | Dec. 2, 1947 |